Nov. 18, 1924.

L. E. SEKULSKI 1,515,890

SPIRAL CONVEYER AND CHUTE

Filed March 24, 1920   3 Sheets-Sheet 1

INVENTOR
Lee E. Sekulski.
by Paul & Paul
HIS ATTORNEYS

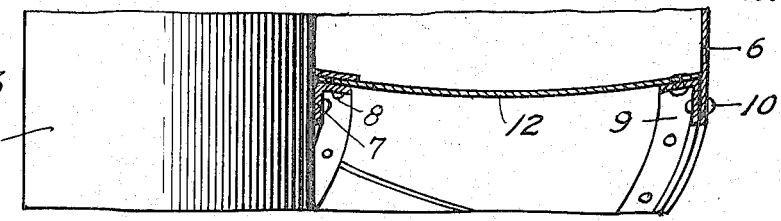
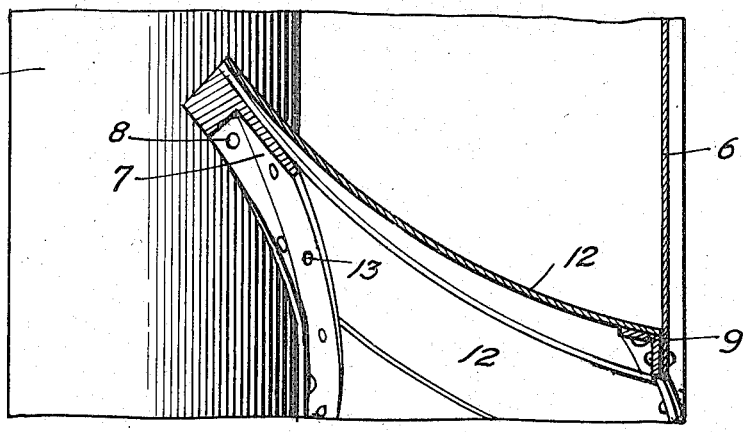
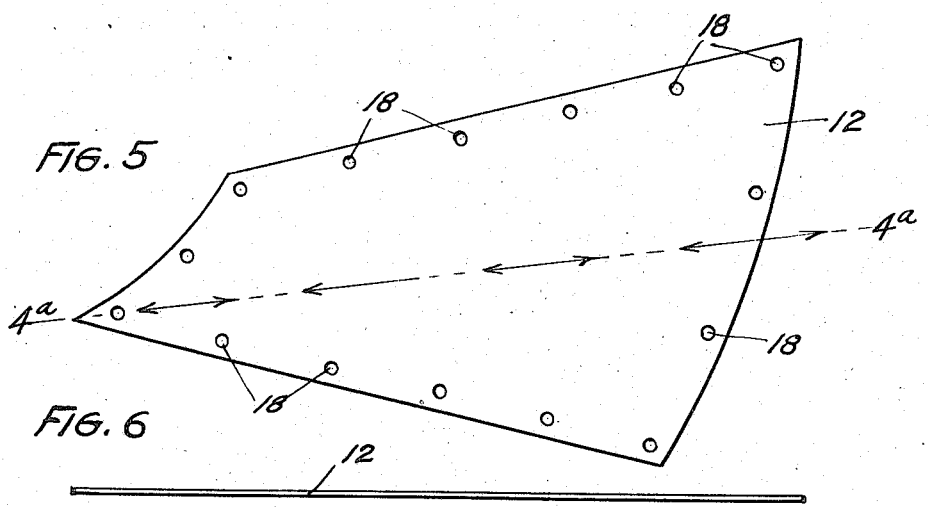
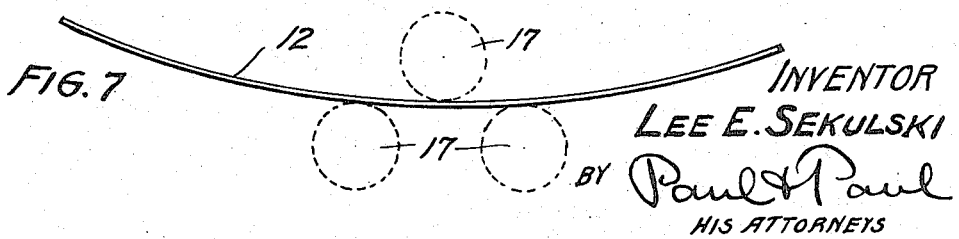

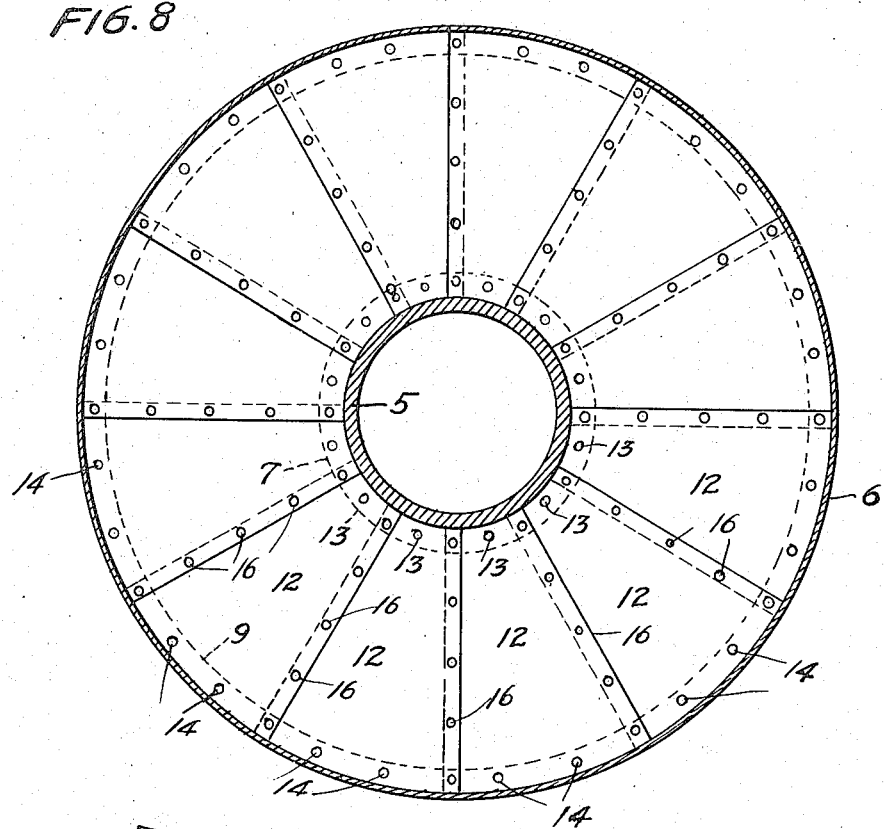
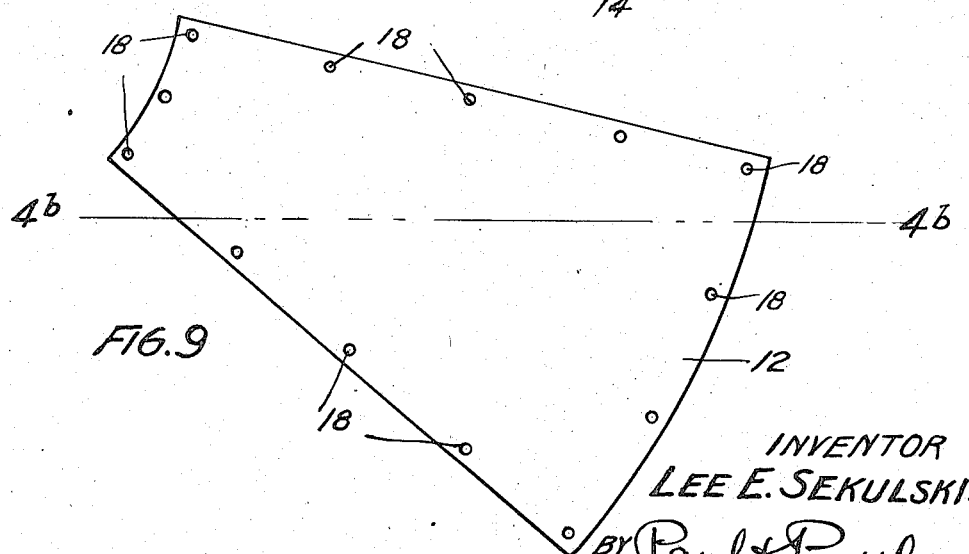

Patented Nov. 18, 1924.

1,515,890

UNITED STATES PATENT OFFICE.

LEE E. SEKULSKI, OF ELLWOOD CITY, PENNSYLVANIA, ASSIGNOR TO MATHEWS GRAVITY CARRIER COMPANY, OF ELLWOOD CITY, PENNSYLVANIA, A CORPORATION OF PENNSYLVANIA.

SPIRAL CONVEYER AND CHUTE.

Application filed March 24, 1920. Serial No. 368,298.

*To all whom it may concern:*

Be it known that I, LEE E. SEKULSKI, a citizen of the United States, resident of Ellwood City, in the county of Lawrence and State of Pennsylvania, have invented certain new and useful Improvements in Spiral Conveyers and Chutes, of which the following is a specification.

My invention relates in general to the construction and manufacture of metallic spiral conveyers and chutes, and more particularly to the production of the segmental tread plates generally used to form the spiral tread or floor of such conveyers or chutes.

Heretofore the manufacture of these plates has been an exceedingly expensive item in the production of this class of conveyers and chutes for the reason that the spiral twist or warp of the plates has been difficult to produce, and has been a matter of several distinct operations. It has, heretofore, in the usual practice, been necessary to heat each plate and press it between dies in order to form it to the proper twisted shape. For this reason also it has been necessary to provide a set of forming dies for each size of conveyer or chute.

The object of my invention is to do away with the use of all special machinery and extra labor involved in the process of manufacturing the tread plates and to produce a better result and by simpler and much less expensive means.

My invention consists generally in a spiral chute or conveyer having its floor or tread formed of a series of connected sheets, each sheet being curved so as to form an irregular segment of the surface of a cylinder with its axis at an angle to any radial line of the cylinder formed by the outer circumference of the chute.

The invention consists further in the constructions and combinations hereinafter described and particularly pointed out in the claims.

The invention consists further in the herein described method of forming spiral chutes or conveyers.

In the accompanying drawings illustrating the invention and forming part of the specification.

Figure 3 is a vertical section through the tread of the spiral on the line 3—3 of Figure 2.

Figure 4 is a similar section on the line 4—4 of Fig. 2.

Figures 5, 6 and 7 are details of one form of plate.

Figures 8 and 9 show an alternative form of plate.

Figure 1:
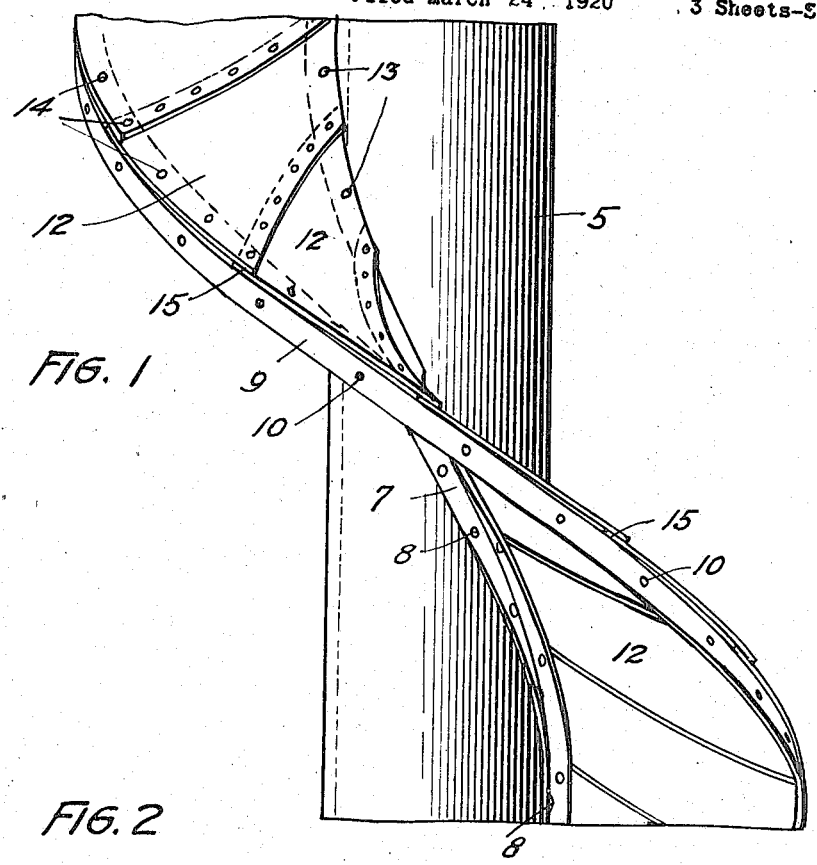
Figure 1 is an elevation of a spiral conveyer or chute of the vertical type, with the enclosing housing removed and showing a tread constructed in accordance with my invention.

As shown in the drawings 5 is the cylindrical or hollow shaft or axis around which the spiral or floor of the chute is constructed. 6 is the outer cylindrical housing enclosing the tread. A helical angle bar 7, conforming to the helix of the inner tread line around the shaft, is secured in position by rivets or bolts 8. A helical angle bar 9, conforming to the helix of the outer tread line, is secured to the housing 6 by rivets or bolts 10.

12 represents segmental tread plates which, as here shown, are arranged overlapping each other, and are riveted to the inner angle bar 7 by countersunk rivets 13, and to the outer angle bar 9 by similar rivets 14. The edges of plate 12, which, as here shown, overlap in a downward relation, are preferably secured together by means of rivets or bolts 16, countersunk on top to present an unobstructed surface to permit the free passage of articles in a downward direction.

If preferred the cylindrical inner and outer walls of the structure may be omitted, and guard plates, usually from 10 to 24 inches high, may be employed in place of said walls.

In forming the spiral tread each plate is cut in substantially the form of an irregular tetragon or quadrangle, as shown in Figures 2 and 5, or 8 and 9 of the drawings. Each plate has its inner and outer ends cut on curved lines, conforming substantially to spiral lines on the outer wall of the axis or shaft 5, and on the inner wall of the cylindrical housing 6, and the outer ends of the plates are wider than the inner ends.

Figure 2:
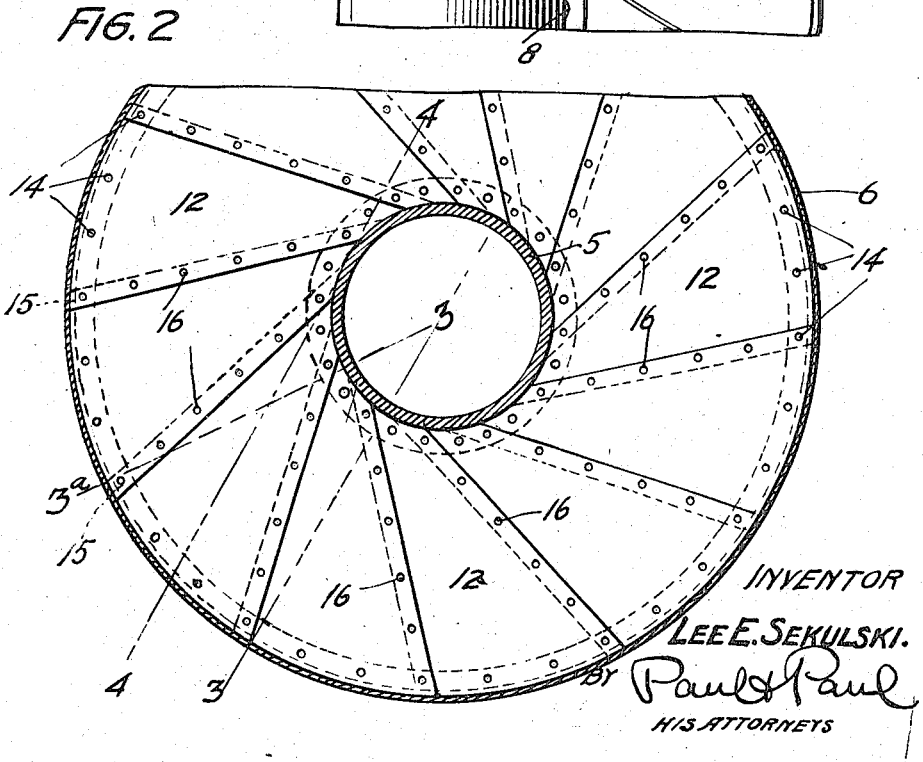
Figure 2 is a plan sectional view of the chute.

The plates may be cut so that when assembled their straight boundary, or side lines extend diagonally or angularly across radial lines of the cylinder formed by the enclosing wall of the spiral, as shown in Figures 2 and 5 of the drawing. While I have used this form of plate with marked success the form shown is not, however, essential. The plates may be cut with their straight or side boundary lines substantially coinciding with radial lines of the cylindrical enclosing wall of the chute, (see Figures 8 and 9 of the drawing).

I do not limit myself to the form of plate shown in Figures 2 and 5 of the drawing, or to the form shown in Figures 8 and 9, but I may employ any plate having its inner and outer ends shaped to fit substantially the outer wall of the axis or shaft 5 and the inner wall of the cylindrical housing 6, and with its straight boundary lines extending angularly across, or coinciding with, radial lines of the chute. But I prefer the form in which the opposite side edges will extend angularly across radial lines of the spiral as when so formed a box or package will travel over the edge of each plate at an angle instead of sliding squarely over the side lines or edges and this results in a smoother travel of the package or box. It also results in giving greater strength to the spiral path and with less liability of cracking the plates in case of overloading.

After the plates are cut they are passed between straight faced bending rolls 17 (see Figure 7) to produce a single curvature therein. A slight irregularity may be found to exist, after the rolling, in the edges of the plates. This is not sufficient, however, to prevent the overlapped edges of the plates from substantially nesting together when assembled. If there is any slight irregularity it may be easily corrected, however, in the assembling of the plates by rivets or bolts through the series of holes 18.

No heating of the plates, with this method of manufacture, is necessary, as the plates can be curved by being rolled cold. By adjusting the rolls 17 any degree of curvature can be imparted to the plates, differing in size for different conveyers. The rolls 17 may be of inexpensive construction, such as generally employed for curving or bending sheet metal plates. In bending the plates they are passed between the rolls in a direction that is at an angle to any line on the plate that will, in the assembled conveyer, be a radial line of the completed spiral (see line 4ª—4ª Figure 5). When plates of the form shown in Figures 2 and 5 of the drawings are assembled this line will be substantially coincident with the line 4—4 of Figure 2, and the contiguous edges of the plates will have substantially the same curvature, and will substantially fit together when the edge of one is overlapped or nested with the other, and said overlapping portions of the plates may readily be secured by riveting as hereinbefore described. As each of these radial lines, because of the spiral form of the conveyer, is, at different portions of its length, in different planes, the plates must be shaped to conform substantially to the difference helix angles of the inner and outer supporting bars 7 and 9.

Each of the plates 12 being bent on a simple curve, as illustrated in Figure 7, will constitute an irregular segment of a cylinder, the axis of which will be at an angle to any vertical plane radiating from the center of the chute or spiral.

Before my invention it has been generally necessary, in constructing the treads of spiral conveyers or chutes, to heat said plates and shape them between dies. A pair of dies has been found necessary for each size of plate required for each diameter and pitch of spiral. By my method of forming spirals I am enabled to bend the plates while cold, in simple curves using ordinary bending rolls, thereby materially reducing the cost of construction of such chutes.

Each plate may be substantially described as a concave tread plate. This form of plate is not objectionable in operation, but on the contrary is found to be even more effective than a substantially flat plate having somewhat less tendency to cause the articles to pass down the chute in contact with the outer wall thereof.

I do not limit myself to the exact shape of the plates shown and described, or to any particular degree of curvature thereof, as the same may be varied in many particulars without departing from my invention.

While I have shown the lower edge of each tread plate overlapping the upper edge of the next succeeding tread plate, said edges being secured together by suitable rivets, and prefer this arrangement, I do not wish to be limited thereto as the edges of the plates may be secured together by butt joints, or by flanges or strips overlapping the under sides of the joints between the plates.

I claim as my invention:

1. A spiral chute consisting of a series of tread plates, each consisting of an irregular tetragon bent into the form of an irregular segment of a cylinder the axis of which will be at an angle to any vertical plane radiating from the center of the spiral chute, the opposite edges of the plates when assembled extending angularly across radial lines of the spiral, and each plate connected with the other along their adjacent edges.

2. The method of manufacturing the tread of spiral chutes consisting in forming a series of plates, wider at their outer than at their inner ends, bending said plates by passing the same between rollers on a line extending angularly to radial lines of the assembled tread, and securing the contiguous edges of said plates together.

In witness whereof, I have hereunto set my hand this 12th day of March, 1920.

LEE E. SEKULSKI.

Witnesses:
H. S. BUCK,
WONBERG NELSEN.